United States Patent Office 3,152,480
Patented Oct. 13, 1964

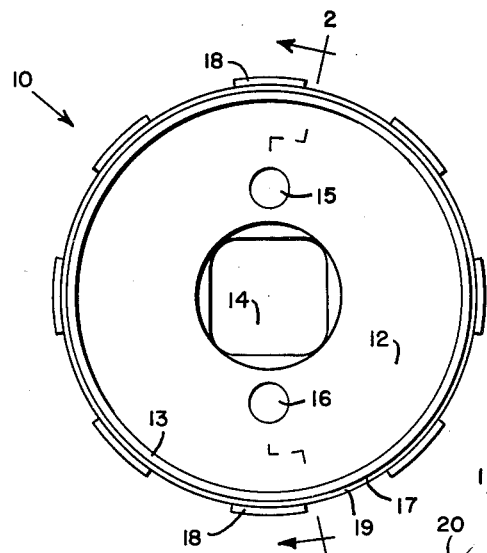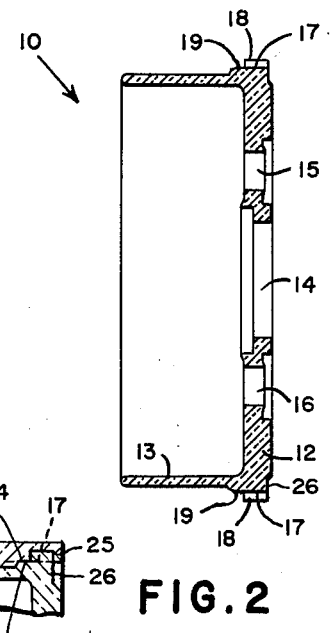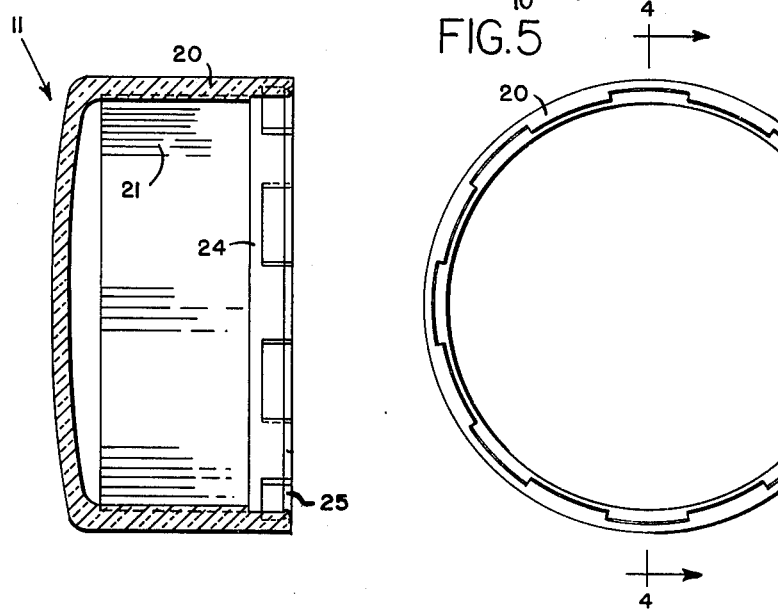

3,152,480
INSTRUMENT CASING
Harry W. Hoff, Jr., Quakertown, Pa., assignor to Ametek, Inc., New York, N.Y., a corporation of Delaware
Filed Aug. 27, 1962, Ser. No. 219,536
6 Claims. (Cl. 73—431)

The present invention relates to gauges, and particularly to a new and improved cover case and backplate for a gauge such as a pressure gauge or the like.

Many demands are required of gauges in modern industry. To mention only one, a problem arose in which the cover case and backplate of a pressure gauge were required to make a 100 percent seal against leakage under one foot of water for two hours at a water temperature of 95° F.; survive a 240-hour salt spray test of 20 percent sodium chloride solution; and permit separation of the cover case from the backplate when a pressure of ten pounds per square inch is generated within the case, so that should the pressure-sensitive element of the gauge leak, the cover case and backplate will separate, relieving any substantial buildup of pressure therein.

The principal object of the present invention is to provide a cover case and backplate having a snap connection between them, facilitating their ready separation.

Another object of the invention is to provide such a cover case and backplate in which the snap connection is such as to prevent relative turning between the cover case and backplate.

Still another object of the invention is to provide such a cover case and backplate in which the snap connection will provide a 100 percent seal against leakage when the assembly is submerged in water.

Still another object of the invention is to provide such a cover case and backplate which will be capable of withstanding a saline spray for an extended period of time.

Still another object of the invention is to provide such a cover case and backplate assembly which will separate upon the buildup of a relatively low pressure therein.

The above, other objects and novel features of the invention will become apparent from the following specification and accompanying drawing which is merely exemplary.

In the drawing:

FIG. 1 is a plan view of a backplate to which the principles of the invention have been applied;

FIG. 2 is a sectional view taken substantially along line 2—2 of FIG. 1;

FIG. 3 is a plan view of a cover case for assembly with the backplate of FIGS. 1 and 2;

FIG. 4 is a sectional view taken substantially along line 4—4 of FIG. 3; and

FIG. 5 is an enlarged fragmentary sectional view of the assembled cover case and back plate.

Referring to the drawing, the principles of the invention are shown as applied to a backplate 10 and a cover case 11 therefor. Both of these elements are preferably made from a thermoplastic such as a polycarbonate resin. The backplate 10 may comprise a plate element 12 having a thin, upstanding wall 13 spaced slightly inwardly from its outer peripheral edge. The center of the plate 13 may include a transverse passage 14 for the reception of fitting means adapted to connect gauge mechanism (both not shown) within the assembled cover and backplate to a source exteriorly of the casing, the value of which is to be measured. Other holes 15 and 16 may be provided in plate 10 for receiving fastening means to attach the gauge mechanism within the assembly to the backplate 10.

The wall 13 forms with the outer peripheral edge of plate 10 a relatively narrow, cylindrical surface 17 of slightly greater diameter than the outside diameter of the wall 13. This narrow, cylindrical surface 17 may have formed on it spaced keys 18. The width of keys 18 is slightly less than that of the narrow surface 17, thus providing an uninterrupted cylindrical sealing surface 19 completely surrounding the plate element 12 for a purpose to be described later.

The cover case 11 may comprise a tubular element 20 having one of its ends closed and its side wall provided with serrations 21 internally or externally thereof. In the embodiment disclosed, the serrations 21 are formed on the inner surface of the tubular element 20. The edge 22 of cover case 11 may be provided with spaced keyways 23 formed on the inner surface of the tubular element 20 and having dimensions and being spaced such that they register, and make a snap connection with the keys 18 on the backplate 10. The dimension of the keyways 23 parallel to the longitudinal axis of the element 20 is such that a narrow, uninterrupted, annular band 24 extends about the inner surface of tubular element 20 between the ends of the keyways 23 and the one ends of the serrations 21. The band 24 is adapted to make a continuous, uninterrupted seal with the sealing surface 19 on the backplate 10.

In order to effect a snap action between the backplate 10 and the inner surface of the tubular element 20, the latter is provided with an inwardly extending bead 25 of a radius in the embodiment disclosed in the order of about 0.010 inch at the open end of element 20. This bead 25 extends along the keyways 23 as well as along the surfaces extending between said keyways.

The cover case 11 is preferably made from clear, transparent plastic while the backplate 10 and wall 13 are preferably made from a non-transparent colored plastic, which combines with the translucent effect of the serrated side wall of the tubular element 20 to produce a more concentrated image of the face of the dial within said cover.

The seal produced by the mating of the continuous uninterrupted surfaces 19 on the backplate 10 and 24 between the keyways 23 and the end of the serrations 21 on the cover case 11 is such that the cover case 11 will separate from the backplate 10 should a pressure within the assembly exceed a safe limit in the order of about ten pounds per square inch. In this way, there is no danger of the assembly confining excessive pressures in the event of a leak developing in the pressure-sensitive mechanism therein.

The sealing also could be accomplished or augmented by placing a suitable plastic or composition in the well 26 at the back of the gauge. The well is formed by the rear face of the back plate 10 lying inwardly of the rearmost surface of the cover 11 such that bead 25 assists in retaining the back plate in place. The well will accept a liquid or similar sealant without running over the sides of the case.

Although the various features of the new and improved cover casing and backplate have been shown and described in detail to fully disclose one embodiment of the invention, it will be evident that changes may be made in such details and certain features may be used without others without departing from the principles of the invention.

What is claimed is:

1. In a gauge casing, a backplate having a plurality of keys on the peripheral edge thereof of a width providing a continuous uninterrupted annular surface surrounding said peripheral edge, a cover case cooperating with said backplate, said cover case being tubular in form and closed at one end thereof, the open end of said tubular case including keyways formed on the inner surface of said tubular case and of a width providing a continuous uninterrupted annular surface surrounding the inner periphery of said tubular cover case, said backplate and said cover case being arranged in cooperating position such that the keys and keyways register when the backplate and cover case are forced together, the two annular surfaces cooperating to provide a tight seal between the backplate and said cover case, and bead means between said backplate and cover case for providing a snap connection between the two.

2. In a gauge casing, a backplate having a plurality of keys on the peripheral edge thereof of a width providing a continuous uninterrupted annular surface surrounding said peripheral edge, an annular flange of less diameter than that of said continuous annular surface extending from said backplate, and a cover case cooperating with said backplate, said cover case being tubular in form and closed at one end thereof, the open end of said tubular case including keyways formed on the inner surface of said tubular case and of a width providing a continuous uninterrupted annular surface surrounding the inner periphery of said tubular cover case, said backplate and said cover case being arranged in cooperating position with said backplate closing said open end of said tubular case, and with the keys and keyways in registration when the backplate and cover case are forced together.

3. In a gauge casing, a backplate having a plurality of keys on the peripheral edge thereof of a width providing a continuous uninterrupted annular surface surrounding said peripheral edge, an annular flange of less diameter than that of said continuous annular surface extending from said backplate, and a cover case cooperating with said backplate, said cover case being tubular in form, having a serrated side wall and closed at one end thereof, the open end of said tubular case including keyways formed on the inner surface of said tubular case and of a width providing a continuous uninterrupted annular surface surrounding the inner periphery of said tubular cover case, said backplate and said cover case being arranged in cooperating position with said backplate closing said open end of said tubular case with said annular surfaces facing one another, and with the keys and keyways in registration when the backplate and cover case are forced together.

4. In a gauge casing, a backplate having a plurality of keys on the peripheral edge thereof of a width providing a continuous uninterrupted annular surface surrounding said peripheral edge, an annular flange of less diameter than that of said continuous annular surface extending from said backplate, a cover case cooperating with said backplate, said cover case being tubular in form, having a serrated side wall and closed at one end thereof, the open end of said tubular case including keyways formed on the inner surface of said tubular case and of a width providing a continuous uninterrupted annular surface surrounding the inner periphery of said tubular cover case, said backplate and said cover case being arranged in cooperating position such that the keys and keyways register when the backplate and cover case are forced together, the two annular surfaces cooperating to provide a tight seal between the backplate and said cover case, and bead means between said backplate and cover case for providing a snap connection between the two.

5. In a gauge casing, a backplate made from a polycarbonate resin and having a plurality of keys on the peripheral edge thereof of a width providing a continuous uninterrupted annular surface surrounding said peripheral edge, and a cover case made from a polycarbonate resin and cooperating with said backplate, said cover case being tubular in form and closed at one end thereof, the open end of said tubular case including keyways formed on the inner surface of said tubular case and of a width providing a continuous uninterrupted annular surface surrounding the inner periphery of said tubular cover case, said backplate and said cover case being arranged in cooperating position with said backplate closing said open end of said tubular case with said annular surfaces facing one another, and with the keys and keyways in registration when the backplate and cover case are forced together.

6. In a gauge casing, a backplate having a plurality of keys formed on the peripheral edge thereof, and a cover case adapted to cooperate with said backplate, said cover case being tubular in form and closed at one end thereof, the open end of said tubular case including circumferentially spaced keyways formed on the inner surface of said tubular case, and an inwardly extending bead means at the outer edge of said inner surface, said backplate and said cover case being arranged in cooperating position such that the keys and keyways register when the backplate and cover case are forced together over said bead means with a snap action, and the assembled cover case and backplate can be rotated while a force resists rotation of the backplate without relative rotation occurring between said cover case and backplate.

References Cited in the file of this patent

UNITED STATES PATENTS

| | | |
|---|---|---|
| 2,380,215 | Caldara | July 10, 1945 |
| 2,600,811 | Suinat | June 17, 1952 |
| 2,693,896 | Brown | Nov. 9, 1954 |
| 2,720,748 | Gisiger | Oct. 18, 1955 |